Nov. 29, 1966   M. F. STRATMAN   3,289,061
LEAD SCREW COMPENSATOR,
Filed Oct. 14, 1963   3 Sheets-Sheet 1
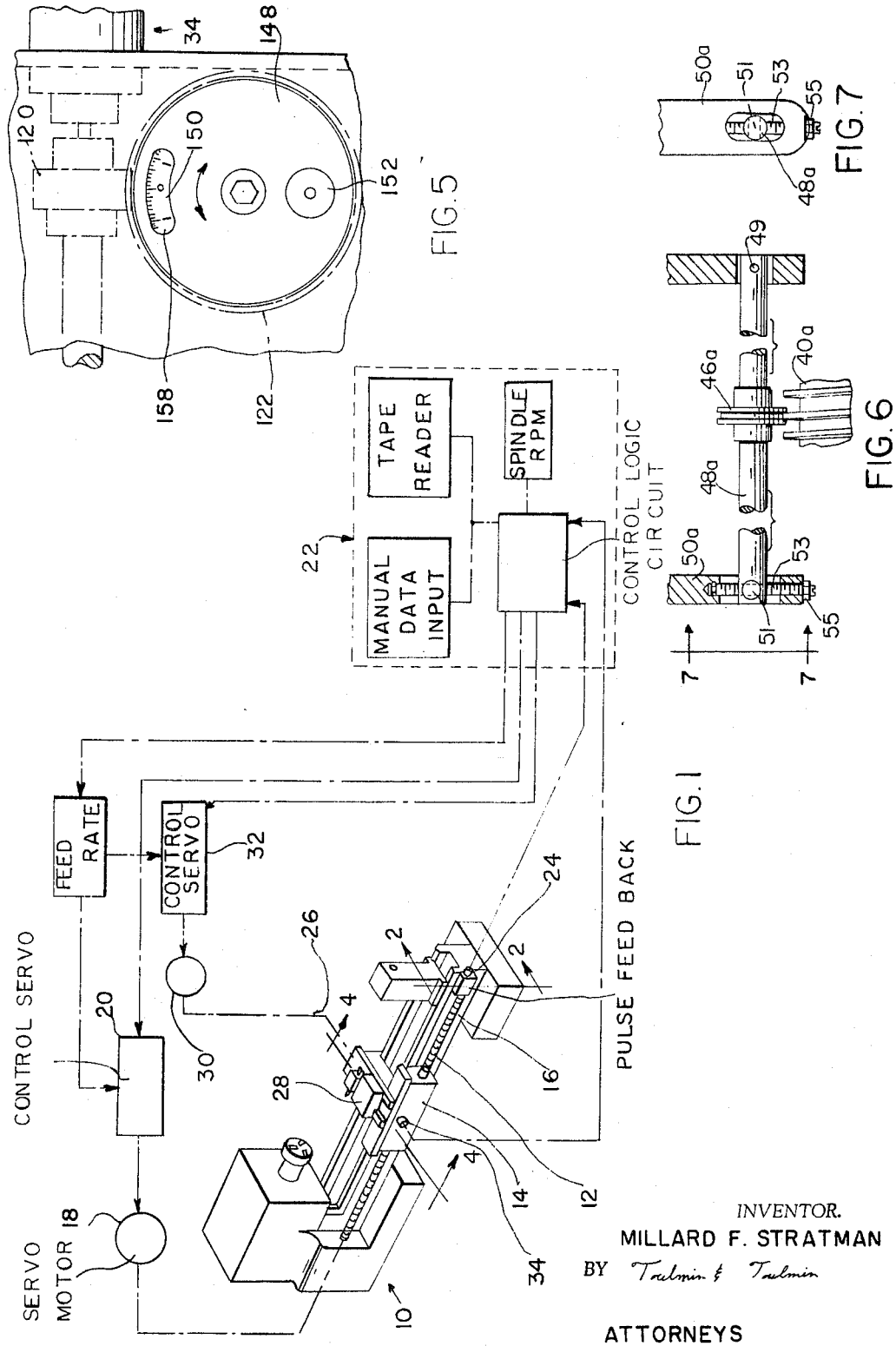
INVENTOR.
MILLARD F. STRATMAN
BY Toulmin & Toulmin
ATTORNEYS

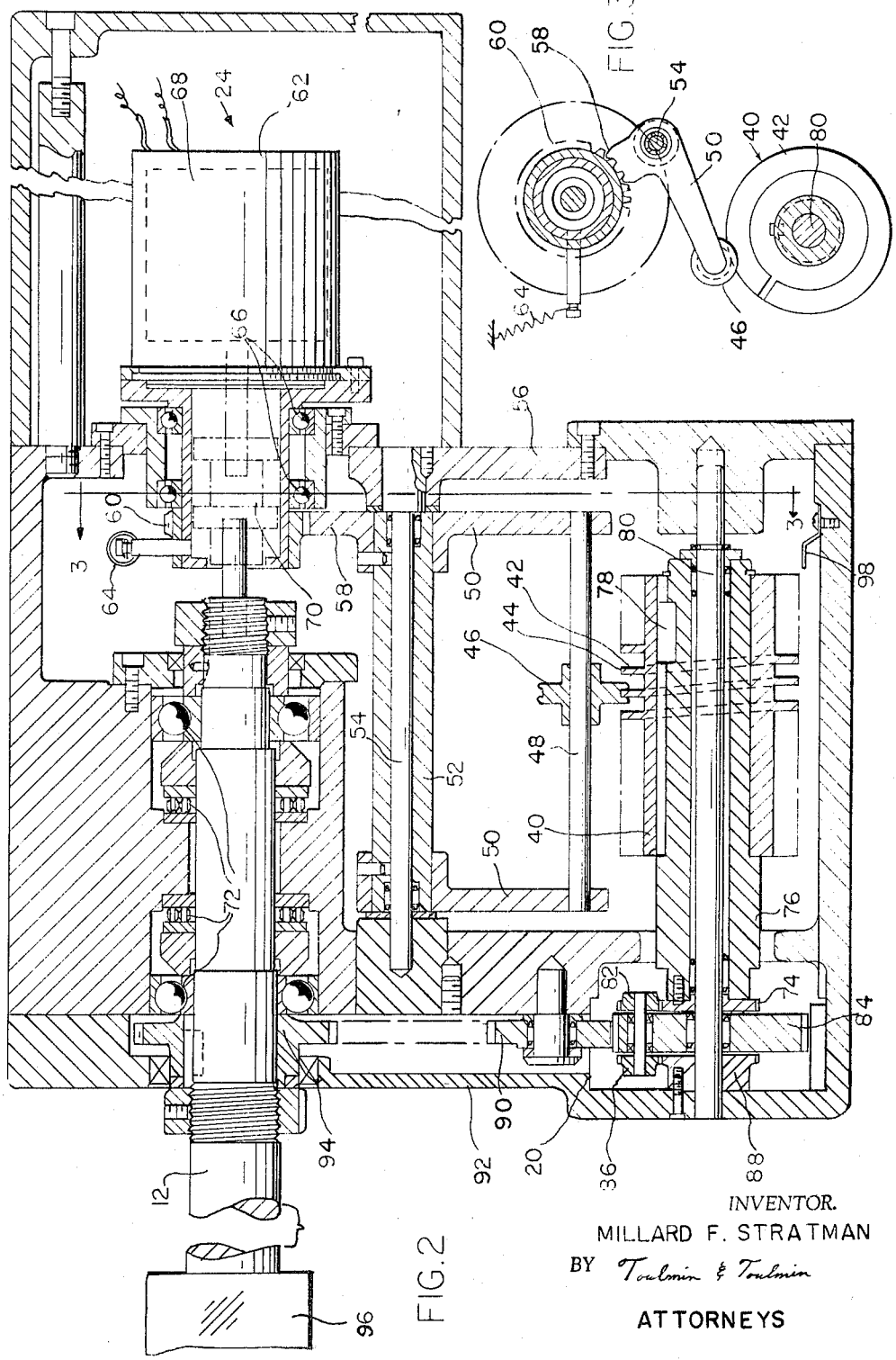

United States Patent Office 3,289,061
Patented Nov. 29, 1966

3,289,061
LEAD SCREW COMPENSATOR
Millard F. Stratman, Cincinnati, Ohio, assignor to The R. K. Le Blond Machine Tool Co., Cincinnati, Ohio, a corporation of Delaware
Filed Oct. 14, 1963, Ser. No. 315,837
9 Claims. (Cl. 318—18)

This invention relates to machine tools and the like and is particularly concerned with the compensation of lead screw errors in machine tools.

Most machine tools such as lathes and the like have lead screws that are depended upon to effect extremely accurate movement of the parts of the machine tool such as the longitudinal movement of the carriage along the lathe bed and the transverse movement of the tool slide on the carriage. While screws of this nature are formed to an extremely high degree of accuracy, there are nevertheless of necessity minor errors therein which, unless compensated for in some manner, introduced inaccuracies into the workpieces machined in the machine tool. There have been many arrangements proposed and used for effecting such compensation, but heretofore such arrangements have been relatively expensive and complex and many times do not accomplish the desired compensation with accuracy. In automatically controlled machine tools of the tape control type, which might be referred to broadly as computer controlled machine tools, one attempt that has been made to effect compensation has been to vary a critical voltage in the computer circuit thereby to vary the amount of movement of the lead screw in response to a predetermined input to accomplish compensation for errors in the lead screw.

The present invention is particularly concerned with compensation for lead screw errors in an automatically controlled machine tool of the computer controlled type in which an extremely simple effective structure is employed that produces superior results over what has been done heretofore.

A particular object of this invention is the provision of a method and apparatus for compensating for lead screw errors in a tape controlled machine tool or the like which involves absolutely no modification of the electrical circuitry pertaining to the control system for the machine.

Still a further object of this invention is the provision of a method and apparatus for compensating for lead screw errors in machine tools and the like wherein compensation can be effected of a relatively long lead screw, but wherein the compensating device is relatively compact.

Still another object of this invention is the provision of a method and apparatus for compensating for lead screw errors in a machine tool or the like where the compensating device can readily be incorporated in substantially conventional machine structures.

These and other objects and advantages of this invention will become more apparent upon reference to the following specification taken in connection with the accompanying drawings, in which:

FIGURE 1 is a schematic view of a lathe showing in block diagram the components of the control circuit therefor;

FIGURE 2 is a sectional view indicated by line 2—2 on FIGURE 1 showing the arrangement for compensating for errors in the lead screw that drives the carriage of the machine;

FIGURE 3 is somewhat fragmentary sectional view indicated by line 3—3 on FIGURE 2 showing in detail a part of the compensating structure;

FIGURE 5 is a fragmentary side elevational view indicated by line 5—5 on FIGURE 4;

FIGURE 6 is a somewhat schematic view of a modification of the structure of FIGURES 2 and 3, and FIGURE 7 is a view looking in from the left side of FIGURE 6 as indicated by line 7—7 thereon.

Figure 4:
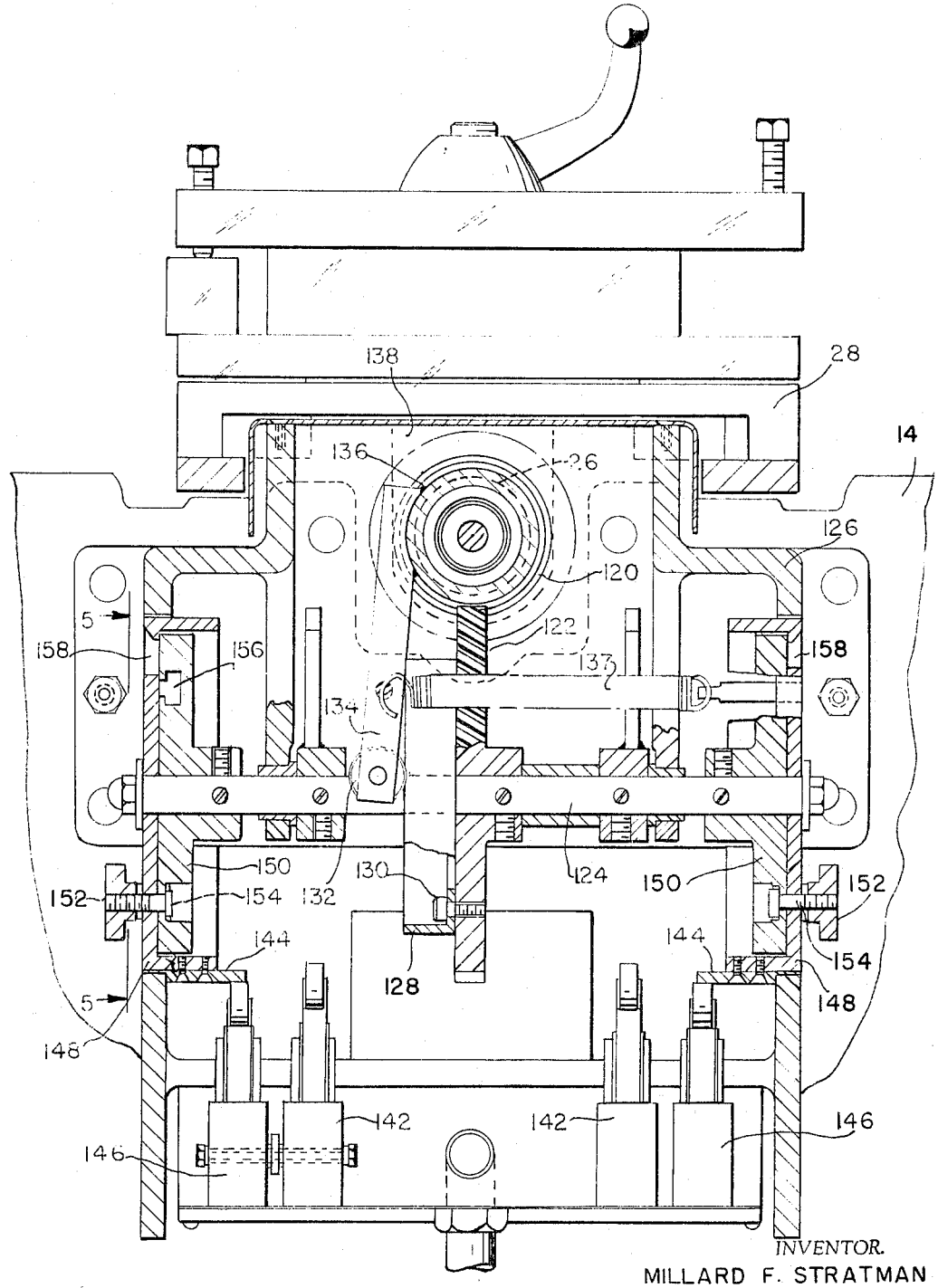
FIGURE 4 is a sectional view indicated by line 4—4 on FIGURE 1 showing the compensating device according to the present invention as applied to the cross feed screw of the machine.

Referring to the drawings somewhat more in detail, FIGURE 1 shows a lathe 10 having a bed 16 along which a carriage 14 is slidable. A lead screw 12 is carried by the bed and a nut pertaining to the carriage engages the lead screw so that as lead screw is rotated, the carriage is caused to move along the bed. The lead screw is connected for being driven by a motor generally designated 18 which is supplied with power from a control servo 20 that is, in turn, under the control of a conventional mechanism generally indicated at 22 and which comprises a tape reader or the like. Pertaining to the lead screw 12 is a feed back unit generally designated 24 which feeds back information relative to the position of the lead screw so that following an input into the controlling logic circuit, the lead screw will rotate a predetermined amount as determined by the information fed back to the logic circuit by the feed back unit.

The carriage 14 also has a lead screw 26 associated therewith which drives the tool slide 28 laterally of the carriage. Lead screw 26 is connected for being driven by a motor 30 supplied through a servo 32, and associated with lead screw 26 is a feed back unit 34 that feeds back information to the logic circuit thereby to control the rotation of lead screw 26 in accordance with the input signal.

The present invention proposes to compensate for errors in the lead screws by adjustment of the feed back unit pertaining to the particular lead screw. Each of the said feed back units consists of a rotor driven by the pertaining lead screw and a stator within which the rotor is located. The present invention proposes to adjust the angular position of the stator thereby to determine the angular position of the lead screw so that inaccuracies in the lead screw are thereby compensated.

FIGURES 2 and 3 will show the proposed structure as it is applied to lead screw 12. This structure takes the form of a cam driven with the lead screw and having a contour corresponding to the pattern of inaccuracies in the lead of the lead screw. In FIGURE 2 the cam member is the cylindrical member designated 40, and this member has formed therein a spiral rib 42 the outer edge of which forms the cam surface. Rib 42 is engaged by roller 46 rotatable on a rod 48 and also slidable therealong so that the roller follower will follow the rib 42 from end to end of member 40. Rod 48 is supported by the arm means 50 that are interconnected by sleeve 52 which is pivoted on shaft 54 in frame 56. The arm means 50 comprises a gear sector 58 meshing with a gear 60 fixed to the stator 62 of the aforementioned feed back unit 24 pertaining to lead screw 12. A biasing spring 64 is provided which urges the stator in a direction to hold follower 46 against rib 42. The stator is accordingly supported in frame 56 by anti-friction bearings 66 and can thus be rotated without changing its relationship to rotor 68 of the feed back unit in any respect except angularly.

The said rotor 68 is drivingly connected with lead screw 12 through the medium of a coupling 70 and the lead screw is furthermore accurately supported in the frame 56 by bearing means 72 which include thrust bearings to prevent any axial movement of the lead screw.

The rotation of the cam member 40 in timed relation to the rotation of lead screw 12 is accomplished by gearing directly interconnecting member 40 with the lead screw. This gearing takes the form of a sun gear 74 fixed to the end of support member 76 to which member 40 is keyed by key 78. Member 76 is accurately supported in casing 56 on shaft 80 provided for this purpose.

Sun gear 74 meshes with a pinion 82 located on one side of a carrier gear 84 and drivingly connected with another pinion 86 on the opposite side of the carrier gear. The second pinion 86 meshes with a sun gear 88 fixedly mounted inside the casing.

Carrier gear 84 meshes with an idler gear 90 mounted in the casing which is in turn engaged by gear 94 on lead screw 12 as indicated by the dot-dash lines 92. The aforementioned gearing will rotate cam member 40 in timed relation to lead screw 12, and the long spiral rib on the cam member is in this manner caused to move at such a rate that the rib of the cam member will be traversed once by follower 46 during the time that nut 96 traverses the threaded portion of the lead screw a single time. To obtain the reduced speed of operation of cam member 40, sun gears 74 and 88 may differ as to the number of teeth thereon while planet pinions 82 and 86 are of the same size. The sun gears may differ in the number of teeth, for example, by one.

In this manner each point along rib 42 corresponds to a specific position of location along the lead screw of the nut 96 driven by the lead screw. The rib 42 of the cam member can thus be caused to tilt or angularly move stator 62 of the feed back unit to compensate for any error in the lead screw at the point therealong pertaining to the position of follower 46 along the said spiral rib. Since lead screw errors are rarely cumulative but are more in the form of small departures from a certain normal movement, it follows that the adjustment of stator 62 will normally be in opposite directions from a pre-determined neutral position and that the cam surface of spiral rib 42 will normally consist of alternating hills and valleys. It is the case, however, that a cumulative error in a lead screw not exceeding the total range of adjustability of stator 62 could be compensated by the device of the present invention, and in this case, the spiral rib would be larger in diameter at one end than at the other and would consist of hills and valleys in addition thereto.

It will be appreciated that the structure is extremely compact and relatively simple and that it involves no modification whatsoever of the electric control system for the machine, and that it is adaptable to substantially conventional structures with very little modification.

In practicing the invention, the carriage of the machine is brought into such position that the left side of the turret slide is in line with the spindle nose of the machine.

The cam member is then located so that pointer 98 is located in the right hand start of the spiral rib or thread 42. The cam follower is then positioned on the spiral rib or thread in the zero position.

The lead screw is now rotated to advance the carriage toward the tail stock end of the machine and readings are taken at one inch intervals during this travel. The deviation from the correct movement of the carriage is recorded at each of these points. The maximum deviation is then selected and these deviations are subtracted from all of the recorded deviations which will give a series of negative numbers.

The multiplying factor of 50 is then employed to determine the acual amount of metal to be removed from the spiral rib or thread 42 to form the cam surface 44. The factor of 50, of course, repersents the ratio between the movement of the follower 46 radially of the cam member with respect to the amount of movement of the carriage produced by such movement of the follower.

The cam is now machined in accordance with the values determined as above and is then checked for accuracy and, finally, is chrome-plated to provide the cam member with a smooth long-wearing cam surface.

With respect to the cross feed screw 26, as will be seen in FIGURE 4, this member has connected thereto a skew gear 120 which meshes with a larger gear 122. Gear 122 is fixed to a shaft 124 rotatably mounted in a casing 126 secured to carriage 14.

Gear 122 has mounted on one face thereof a cylindrical cam member 128 held in place as by screws 130. This cam member may be formed in halves if so desired. The cam member is engaged by follower roller 132 mounted on arm 134 that is biased by spring 137 in a direction to hold the follower against the cam surface of cam 128. Arm 134 at its end opposite roller 132 is fixed to stator 136 of a feed back unit corresponding to feed back unit 24 shown in FIGURE 2. The rotor of this unit is, of course, connected with cross feed screw 26.

It will be apparent that the cam surface of cam 128, the said surface comprising the exposed axial end portion of the cam, will control tilting movement of the stator of the feed back unit as gear 122 is driven by the lead screw. The speed reduction accomplished by gears 120 and 122 will cause the cam 128 to be driven somewhat less than one complete revolution during the interval that nut 138 attached to cross slide 28 traverses the entire length of cross feed screw 26. The cam surface of cam 128 is arrived at in the same manner as described in connection with the cam surface of FIGURE 2 so that instantaneous and continuous correction for errors in the lead of lead screw 26 is made as the nut 138 is driven thereby.

The shaft 124 on which gear 122 is mounted can also be availed of for supporting the non-adjustable limit switch actuating means 140 which cooperate with limit switches 142 and also for supporting the adjustable limit switch actuators 144 that cooperate with the limit switches 146. The limit switches and actuators referred to can be employed for limiting the travel of the cross slide and for changing the movement of the cross slide from rapid advance to feed and vice versa.

The limit switch actuators 144 which are adjustable are carried on drums 148 that are angularly adjustable on the discs 150 which are fixed to shaft 124. The adjustability of drums 148 is accomplished by the knurled knobs 152 threaded to bolts 154 that are transversely slidable in circular slots 156 in discs 150. Discs 150 may be graduated with the graduation being observable through windows 158 in drums 148 whereby the exact positioning of the switch actuators 144 can readily be determined.

In both of the modifications illustrated, the error in lead of the pertaining lead screw is compensated for by adjusting the rotor and stator of a feed back unit driven by the pertaining screw angularly so that the exact position of the lead screw corresponding to an input into the computer control mechanism is modified by the exact amount corresponding to the error in the lead of the lead screw at the particular point thereon that the nut driven thereby is resting.

It will be appreciaited that the present invention does not modify voltages or other components in the electrical circuit so that the correction effected is positive and precise. The structures of the correcting devices are compact and are easily incorporated into existing equipment or into new manufacture.

The structures described above are effective for compensating for manufacturing errors and the like in lead screws, but it has been discovered that there is another type error that can occur when extremely high precision is required. This error is not an error on account of manufacturing tolerances but arises because of temperature differences between the temperature at which the lead screw was compensated and the temperature at which it operates. This particular error is a straight line error from one end of the lead screw to the other and can be compensated for shown somewhat schematically in FIGURES 6 and 7. In these views the shaft or rod 48a corresponds to rod 48 in FIGURE 2 and carries a corresponding follower roller 46a riding on the compensating cam 40a. Rod 48 is carried in the frame 50a which corresponds to the frame supporting rod 48 in FIGURE 2.

In FIGURES 6 and 7 however compensation is made for a straight line error in the lead screw which could come about because of a temperature condition, by mounting one end of rod 48a pivotally as by pin 49 and then placing in the other end of the rod a nut 51. Nut 51 is engaged by screw 53 which is rotatable but non-axially movable in frame 50a. This screw can be locked in adjusted position by nut 55. Normally, if no compensation because of temperature is required, rod 48a will be held in frame 50a parallel with the axis of rotation of the compensation cam 40a. If, however, it is discovered that an error exists because of the temperature in the lead screw, adjusting screw 53 can be availed of to tilt rod 48a to a predetermined angle relative to the axis of rotation of compensating cam 40a, and this tilting of rod 48a will be so selected that a straight line compensation will be introduced into the compensating arrangement exactly offsetting the straight line error discovered in the lead screw because of temperature.

It will be understood that this invention is susceptible to modifications in order to adapt it to different usages and conditions; and accordingly, it is desired to comprehend such modifications within this invention as may fall within the scope of the appended claims.

I claim:

1. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, and means for adjusting said stator angularly to compensate for errors in the lead screw comprising cam means having a cam surface and connected to the lead screw and driven thereby, a follower bearing on the cam surface and connected to said stator to move the stator angularly in conformity with the contour of said cam surface, said cam surface having a length such that the nut on the lead screw will make a single traverse thereof while the follower makes a single traverse of the cam surface, said cam surface being shaped to deflect such follower from a normal position in conformity with the lead screw error at the point thereof corresponding to the point on the cam surface engaged by the follower, said cam means comprising a cylindrical member having a spiral rib thereof forming the said cam surface, said follower comprising a grooved roller engaging said rib and supported to follow the rib as the member rotates, and means for effecting relative adjustment between said cam means and said follower in conformity with the temperature of the lead screw so as to effect a straight line adjustment of the angular position of said stator as the follower moves along said cam means.

2. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, and means for adjusting said stator angularly to compensate for errors in the lead screw comprising cam means having a cam surface and connected to the lead screw and driven thereby, a follower bearing on the cam surface and connected to said stator to move the stator angularly in conformity with the contour of said cam surface, said cam surface having a length such that the nut on the lead screw will make a single traverse thereof while the follower makes a single traverse of the cam surface, said cam surface being shaped to deflect such follower from a normal position in conformity with the lead screw error at the point thereof corresponding to the point on the cam surface engaged by the follower, said cam means comprising a cylindrical member having a spiral rib thereon forming the said cam surface, said follower comprising a grooved roller engaging said rib, a rod parallel to the member supporting said roller and permitting movement of the roller axially of said member as the member rotates, arm means supporting said rod, means pivotally supporting said arm means for angular movement thereof in conformity with the contour of said rib, and toothed means connecting said arm means with said stator for effecting angular adjustment of the stator as the arm means moves.

3. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, cam means, means drivingly connecting said cam means to the lead screw, and follower means engaging said cam means and connected to said stator for controlling the angular position of said stator in conformity with the contour of said cam means and in timed relation to the movement of the nut along the lead screw, said means drivingly connecting said cam means to said lead screw comprising reduction gearing, and means for effecting relative adjustment between said cam means and said follower in conformity with the temperature of the lead screw so as to effect a straight line adjustment of the angular position of said stator as the follower moves along said cam means.

4. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, and means for adjusting said stator angularly to compensate for errors in the lead screw comprising cam means having a cam surface and connected to the lead screw and driven thereby, a follower bearing on the cam surface and connected to said stator to move the stator angularly in conformity with the contour of said cam surface, said cam surface having a length such that the nut on the lead screw will make a single traverse thereof while the follower makes a single traverse of the cam surface, said cam surface being shaped to deflect said follower from a normal position in conformity with the lead screw error at the point thereof corresponding to the point on the cam surface engaged by the follower, said cam means comprising a cylindrical member having a spiral rib thereon forming the said cam surface, said follower comprising a grooved roller engaging said rib and supported to follow the rib as the member rotates, said cam means being connected to said lead screw by reduction gearing whereby the cam means rotates at a speed reduced from that of the lead screw and is therefore relatively small, and means for effecting relative adjustment between said cam means and said follower in conformity with the temperature of the lead screw so as to effect a straight line adjustment of the angular position of said stator as the follower moves along said cam means.

5. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, cam means, means drivingly connecting said cam means to the lead screw, follower means engaging said cam means and connected to said stator for controlling the angular position of said stator in conformity with the contour of said cam means and in timed relation to the movement of the nut along the lead screw, and means adjustable in conformity with the temperature of the lead screw for effecting straight line adjustment of the position of said stator as said follower means moves along said cam means.

6. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, cam means, means drivingly connecting said cam means to the lead screw, follower means engaging said cam means and connected to said stator for controlling the angular position of said stator in conformity with the contour of said cam means and in timed relation to the movement of the nut along the lead screw, said cam means being shaped to actuate said follower means in accordance with errors in the lead screw whereby adjustment of the angular position of the stator compensates for the said errors, and means for adjusting the position of said follower means relative to said cam means in conformity with the temperature of said lead screw to effect a straight line adjustment of the angular position of said stator as the follower means moves along said cam means.

7. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, means for adjusting said stator angularly to compensate for errors in the lead screw comprising cam means having a cam surface and connected to the lead screw and driven thereby, a follower bearing on the cam surface and connected to said stator to move the stator angularly in conformity with the contour of said cam surface, said cam surface having a length such that the nut on the lead screw will make a single traverse thereof while the follower makes a single traverse of the cam surface, said cam surface being shaped to deflect such follower from a normal position in conformity with the lead screw error at the point thereof corresponding to the point on the cam surface engaged by the follower, said cam means comprising a cylindrical member having a spiral rib thereon forming the said cam surface, said follower comprising a grooved roller engaging said rib, a rod parallel to the member supporting said roller and permitting movement of the roller axially of said member as the member rotates, arm means supporting said rod, means pivotally supporting said arm means for angular movement thereof in conformity with the contour of said rib, toothed means connecting said arm means with said stator for effecting angular adjustment of the stator as the arm means moves, and means for adjusting said rod in said arm means to change the angle of said rod relative to the axis of said cam means to impart a straight line compensation to the position of said stator.

8. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, and means for adjusting said stator angularly to compensate for errors in the lead screw comprising a rotatable, cylindrical cam having a spiral rib cam surface thereon, said cam being drivingly connected to the lead screw by speed reduction gearing, a cam follower bearing on the spiral rib cam surface and supported to follow the rib as the cam rotates, said cam follower being connected to said stator to move the stator angularly in conformity with the contour of said cam surface, said spiral rib cam surface having a length such that the nut on the lead screw will make a single traverse thereof while the follower makes a single traverse of the cam surface, said spiral rib cam surface being contoured to deflect said follower from a normal position in conformity with the lead screw error at the point thereof corresponding to the point on the cam surface engaged by the follower, and means for effecting relative adjustment between said cam and said follower in conformity with the temperature of the lead screw so as to effect a straight line adjustment of the angular position of said stator as the follower moves along said cam means.

9. In a computer controlled machine having a lead screw and a nut driven thereby and a feed back unit driven by the lead screw to feed positional information back to the control unit of the machine, said unit comprising a rotor connected to the lead screw and a stator, means rotatably supporting said stator, and means for adjusting said stator angularly to compensate for errors in the lead screw comprising a cylindrical cam having a radial, end face cam surface, said cylindrical cam being mounted for rotation upon a shaft, speed reduction gearing connecting said shaft to the lead screw so that the cam is rotatably driven in synchronization with said lead screw, a follower bearing on the radial cam surface and connected to said stator to move the stator angularly in conformity with the contour of said radial cam surface, said radial cam surface having a length such that the nut on the lead screw will make a single traverse thereof while the follower makes a single traverse of the cam surface, said radial cam surface being contoured to deflect said follower from a normal position in conformity with the lead screw error at the point thereof corresponding to the point on the cam surface engaged by the follower, and means for effecting relative adjustment between said cam and said follower in conformity with the temperature of the lead screw so as to effect a straight line adjustment of the angular position of said stator as the follower moves along said cam means.

References Cited by the Examiner

UNITED STATES PATENTS

| 2,173,135 | 9/1939 | Zimmerman | 74—569 X |
| 2,861,232 | 11/1958 | Willems | 318—28 |
| 2,937,325 | 5/1960 | Garber | 318—29 |
| 3,039,032 | 6/1962 | Fowler | 318—30 |
| 3,048,053 | 8/1962 | Howe | 74—567 |

ORIS L. RADER, *Primary Examiner.*

JOHN F. COUCH, *Examiner.*

B. DOBECK, *Assistant Examiner.*